United States Patent [19]

Desjardins et al.

[11] 4,088,042

[45] May 9, 1978

[54] VIBRATION ISOLATION SYSTEM

[75] Inventors: Rene A. Desjardins, Media; Charles W. Ellis, Newtown Square; Vladimir Sankewitsch, West Chester, all of Pa.

[73] Assignee: The Boeing Company, Seattle, Wash.

[21] Appl. No.: 720,601

[22] Filed: Sep. 7, 1976

[51] Int. Cl.² .................. F16D 63/00; F16F 15/04; F16F 15/10; B64C 27/00

[52] U.S. Cl. ..................... 74/574; 188/1 B; 248/358 R; 244/17.27; 416/500; 416/145

[58] Field of Search ............ 74/574; 248/20, 8, 7, 248/21, 22, 15, 18, 24, 358 R, 358 AA; 188/1 B, 1 BX; 244/17.11, 17.27, 17.25; 416/144, 145, 500

[56] References Cited

U.S. PATENT DOCUMENTS

| | | | |
|---|---|---|---|
| 3,467,350 | 9/1969 | Tyler | 248/358 AA X |
| 3,845,917 | 11/1974 | Drees | 244/17.27 |
| 3,857,534 | 12/1974 | Drees et al. | 244/17.27 |
| 3,858,831 | 1/1975 | Halwes | 244/17.27 |

OTHER PUBLICATIONS

"Nodalization Applied to Helicopters", David Shipman, S.A.E. Proceedings, Los Angeles, California, 1973.

*Primary Examiner*—Samuel Scott
*Assistant Examiner*—Don E. Ferrell
*Attorney, Agent, or Firm*—Finnegan, Henderson, Farabow & Garrett

[57] ABSTRACT

A vibration isolation system wherein a vibrating mass such as a helicopter rotor-transmission assembly is spring coupled to a body to be isolated, such as the helicopter fuselage, at a plurality of points. Each coupling point includes, in addition to a coupling spring, a weighted lever arm pivotally connected to the vibrating mass and to the body, with the body-to-lever pivot connection lying between the center of gravity of the arm and the vibrating mass-to-lever pivot connection. The coupling spring is in the form of a torsion spring, e.g., torsion bar, coupled between the body and the lever arm at the pivot connection therebetween. Vibratory forces of a predetermined frequency transmitted from the vibrating mass to the body through the spring are substantially cancelled by inertial forces generated by the lever and applied to the body through the body-to-lever pivot connection, thus isolating the body from the vibrating mass at the predetermined frequency. A second form of isolating coupler is disclosed wherein a spring-mass structure is connected to the lever arm and tuned so that vibratory forces of a second, higher, predetermined frequency are also substantially cancelled by the inertial forces coupled to the body through the pivot connection between the body and the lever arm.

20 Claims, 12 Drawing Figures

VIBRATION ISOLATION SYSTEM

FIELD OF THE INVENTION

This invention pertains to vibration isolation systems and, more particularly, to the type of vibration isolation systems wherein forces of inertia set up by vibration-induced motion of an auxiliary mass are applied to cancel vibratory forces in a predetermined frequency range.

BACKGROUND OF THE INVENTION

In certain types of equipment it is highly desirable to provide isolation from vibrations produced through operation of the equipment. The helicopter is an example of such a system. Predominant vibratory forces set up by the rotor and transmission assemblies are produced at frequencies which are proportional to the number of rotor blades and to twice the number of rotor blades. Thus, in a helicopter having a four blade rotor, most pronounced vibrations occur at the so-called four per rev and eight per rev levels. Since rotor velocity remains substantially constant for all modes of operation, these vibrations are of constant frequency and in a typical system occur, for example, at frequencies on the order of 20 Hz and 40 Hz, respectively.

It has heretofore been known that an effective way of isolating a body from a mass vibrating a substantially constant frequency is to spring couple the vibrating mass to the body and to provide an auxiliary mass arranged so that inertial forces generated by vibration-induced displacement of the mass act on the body to substantially cancel the constant frequency vibratory forces transmitted through the coupling spring.

It has, however, been a problem to configure a so-called "nodal" isolator of this type in a form which will be effective in a compact environment, such as a helicopter, where severe restrictions are placed on size, weight and range of available motion. A further difficulty is that this type of isolator has heretofore been effective for only a single frequency of vibration whereby only the basic vibrations, e.g., 4 per rev, have been eliminated.

OBJECTS AND SUMMARY OF THE INVENTION

It is therefore an object of the present invention to provide an improved vibration isolator.

It is an additional object of the invention to provide an improved system of the type described having a compact configuration enabling utilization of the system in space-limited applications.

Another object is to provide an improved vibration isolation apparatus which is adapted to isolate a body against both linearly and angularly applied vibratory forces and, in the specific case of a helicopter rotor-transmission isolation system, to isolate the helicopter airframe from rotor-generated vibrations in the roll and pitch directions as well as in the vertical direction.

It is a further object to provide an improved vibration isolation apparatus which is highly effective in applications where it is desired to isolate a body against vibration at multiple vibratory frequencies.

A further and more specific object is to provide an improved vibration isolator which is highly effective in isolating a body against two predetermined, substantially fixed frequencies of vibration.

To achieve the foregoing objects and in accordance with a first aspect of the invention a vibration isolation system is provided wherein a vibrating mass is spring-coupled to a body to be isolated at a plurality of coupling points, each coupling point including a weighted lever arm which is pivotally connected to both the vibrating mass and the body, the pivotal connection between the body and the lever being located between the vibrating mass-to-lever pivot and the center of gravity of the lever arm. Further, the spring coupling is provided at each coupling point by a torsion spring connected to the lever arm at one of the aforesaid pivots whereby vibratory forces coupled to the body through the torsion spring are equalized by the inertial forces generated by vibration-induced displacement of the weighted lever arm, which inertial forces are applied to the body through the lever-to-body pivot.

In accordance with a second aspect of the invention inertia means coupled between a vibrating mass and a body to be isolated from vibration operate in response to vibratory forces to generate counteracting forces which are applied to the body to substantially eliminate vibration of the latter at a first predetermined frequency. In addition, a spring-mass structure, also responsive to motion of the vibrating mass, operates to generate counteracting forces which are applied to the body to substantially eliminate vibration of the latter at a second predetermined frequency.

The accompanying drawings which are incorporated in and constitute a part of this specification, illustrate preferred embodiments of the invention and, together with the description, serve to explain the principles of the invention.

BRIEF DESCRIPTION OF THE DRAWINGS

In the drawings:

FIG. 6b is a cross-section view of the lever arm shown in FIG. 6a.

DETAILED DESCRIPTION OF THE EMBODIMENTS

Reference will now be made in detail to the present preferred embodiments of the invention, examples of which are illustrated in the accompanying drawings.

Figure 1:
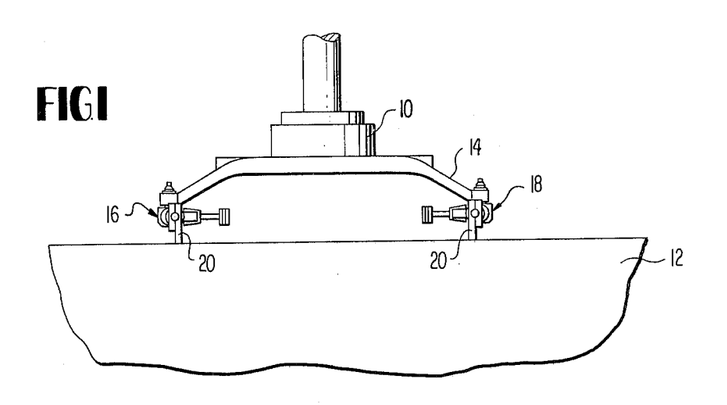
FIG. 1 is a front elevation view showing in outline form the fuselage of a helicopter and further showing a portion of the rotor and transmission unit mounted above the fuselage through use of the vibration isolation system of the invention.
Figure 2:
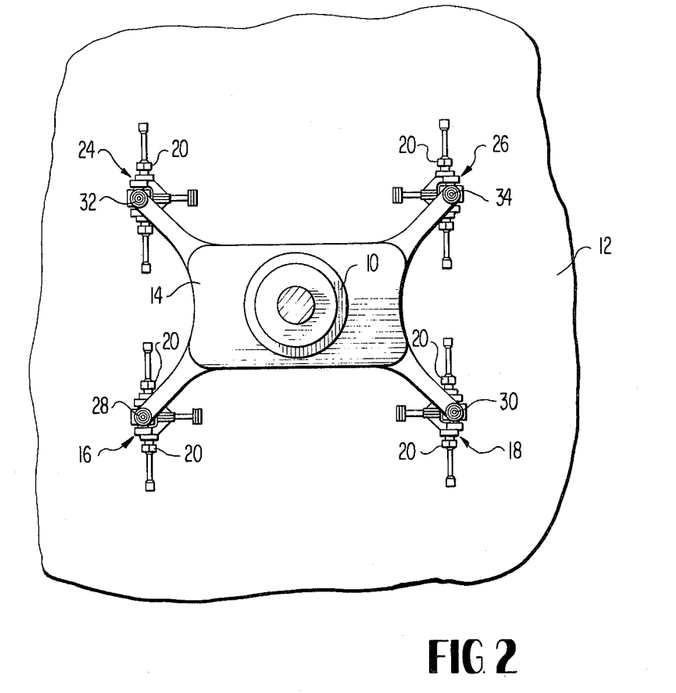
FIG. 2 is a top plan view, partially sectioned, of the helicopter system of FIG. 1.

Referring to FIGS. 1 and 2, which show front elevation and top plans views, respectively, of a helicopter vibration isolation system in accordance with a first embodiment of the invention, a rotor and transmission assembly 10 is connected to the top of fuselage 12 through a frame member 14 and four vibration isolators 16, 18, 24 and 26. Frame 14 is connected at four points 28, 30, 32 and 34 to the four vibration isolators 16, 18, 24 and 26, respectively. The latter, in turn, are coupled to fuselage 12 by eight hanger brackets 20 (two per isolator).

Figure 3:
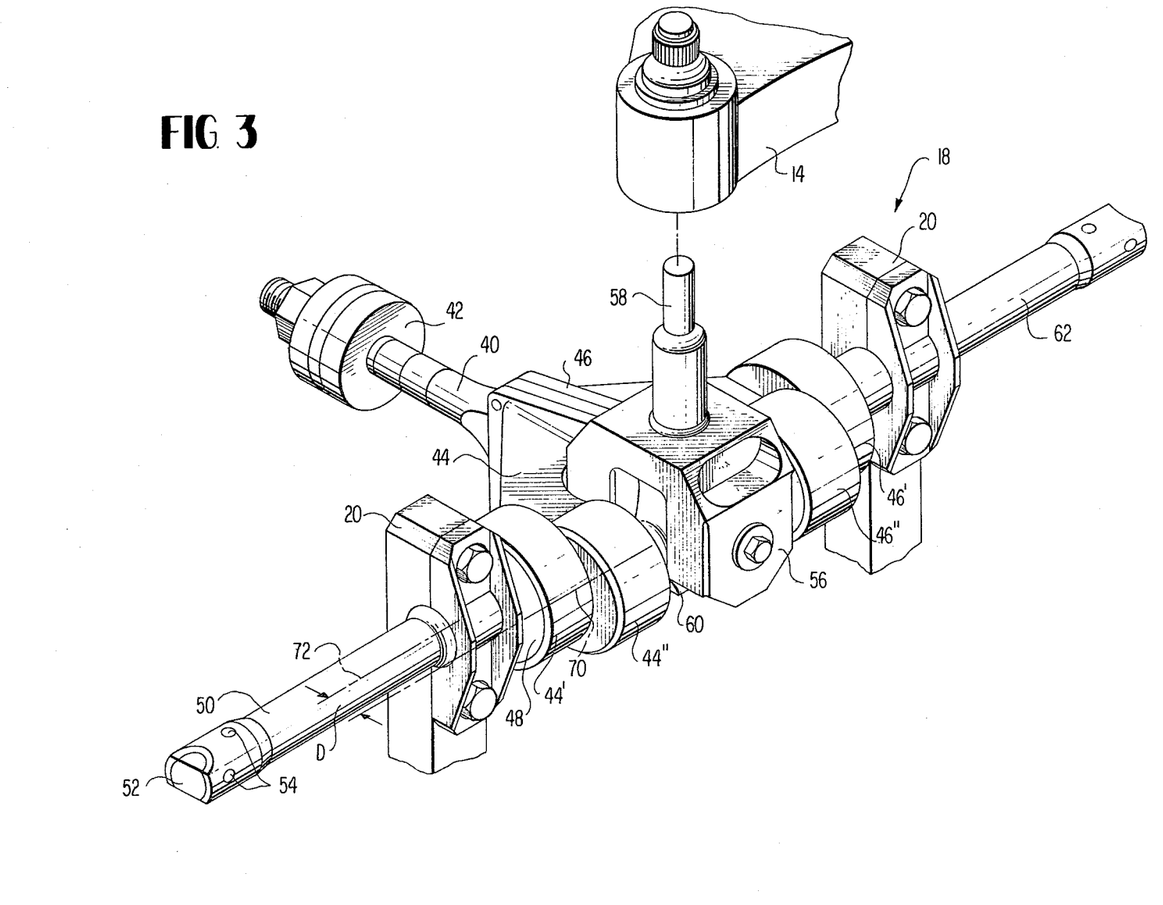
FIG. 3 is a perspective view of one form of the vibration isolation apparatus used in the system of the invention.
Figure 4:
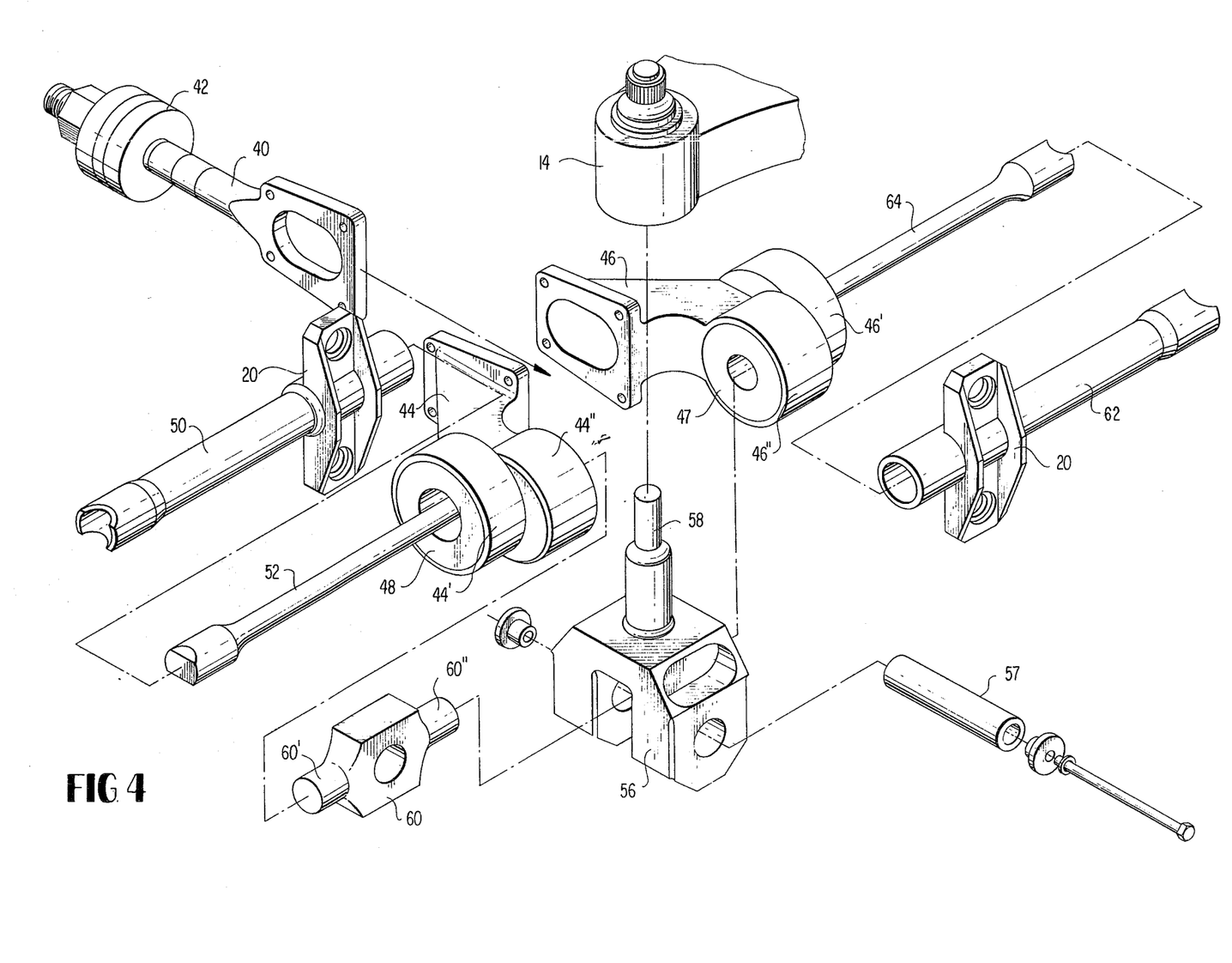
FIG. 4 is an exploded perspective view of the apparatus shown in FIG. 3.

FIG. 3 shows the front, right-hand isolator 18 in detail. FIG. 4 provides an exploded view of the same assembly to more clearly illustrate the interior parts thereof. Since all four isolators are identical, only assembly 18 is hereinafter described in detail. The essential parts of the isolator apparatus include a lever arm 40 having an adjustable weight (42) positioned at one end and having a pair of pivot mounts 44 and 46 at the other end. The frame member 14 supporting the rotor and transmission assembly is pivotally connected to the weighted lever arm 40 by a yoke member 56 which is coupled via a pivot block 60 to the pivot mounts 44 and 46. The latter include pivot bearing housings 44″ and 46″, respectively, which support bearing members 47 to enable lever arm 40 to freely pivot on the pins 60′ and 60″ on a pivot block 60. The yoke 56 and block 60 are pivotally connected by a pin 57. A post member 58 is arranged integrally with the top of yoke 56 to allow connection of the latter to the frame 14. The combination of pivot axes established by pins 57 and 60′ and 60″ provides a gimbal action in the connection to the rotor and transmission assembly.

A second pair of pivot bearing housings 44′ and 46′ are also provided as integral portions of the members 44 and 46. A pair of torsion bars 52 and 64 are rigidly connected to the members 44 and 46, respectively, and project outwardly therefrom along the center line of the bearing housing 44′ and 46′.

A sleeve member 50 is coupled at one end by fasteners 54 to torsion bar 52. The other end of sleeve 50 is free to pivot in bearing 48. In a similar fashion, a sleeve member 62 is connected at one end to torsion bar 64 and is free to pivot at its other end in the bearing provided in bearing housing 46′. Support brackets 20, which connect the isolator assembly to the helicopter fuselage, are connected integrally with the sleeve members 50 and 62. As shown in FIG. 3, the pivot axis of the pivot connection between the weighted lever arm 40 and the frame 14 is indicated at 70. The pivot axis for the pivot connection between the lever arm 40 and the fuselage is shown at 72. The two pivot axes are offset along the lever arm by the distance D. The center of gravity of the lever arm 40 may be changed by adjusting the position of the threaded weight member 42 on the lever arm and is located to the left of axis 72, i.e., on the side opposite axis 70.

Referring back to FIG. 1, it can be seen that the fuselage 12 is suspended from frame 14 at four resilient connection points provided by the four isolator assemblies constructed as shown in FIGS. 3 and 4. The torsion bars 52 and 64 of the isolator assemblies permit a range of resilient vertical motion between the fuselage and the rotor assembly. Vertically directed vibrations generated by the rotor and transmission assembly are coupled to the fuselage through the torsion springs of the isolators and as the fuselage and the rotor assembly move relative to one another in the vertical direction, the weighted lever arms 40 of the isolators pivot about their respective pivot axes 70. Furthermore, the gimbal action provided at the four suspension points by the yoke arrangement 56 allows the rotor assembly to tilt about both the pitch and roll axes whereupon the suspension system is capable of accommodating angularly applied vibratory forces about the pitch and roll axes as well as vertically applied forces. These angularly applied forces appear at the four isolator assemblies as vertical vibrations which are differentially phased.

The vibration isolators illustrated in FIGS. 1–4 operate to isolate the fuselage from the vibrations emanating in the rotor assembly by counteracting the vibratory forces coupled through the torsion springs of the isolator with inertial forces generated by vibration-induced displacement of the weighted lever arms 40. The operation is depicted schematically in FIG. 5.

Figure 5:
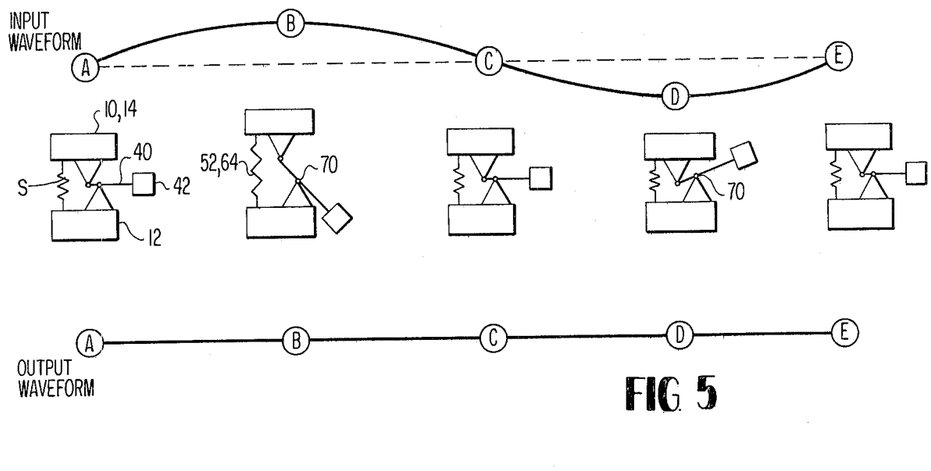
FIG. 5 is a schematic diagram depicting the condition of operation of the apparatus of FIGS. 3 and 4 during one vibration cycle and is used in connection with the description of the basic principal of operation of the device.

FIG. 5 illustrates the operation of the isolator at five different stages during one rotor vibration cycle. The input waveform shown at the top of the diagram represents the displacement of the rotor transmission 10 and frame 14. The output waveform shown at the bottom of the diagram represents the displacement of the fuselage 12. The condition of the isolator is represented at five different points A through E. Each of the mechanical schematics depicts the isolator structure with the block 10, 14 representing the rotor, transmission and frame assembly, the block 12 representing the fuselage, the member 40, 42 representing the weighted lever arm and the spring member S representing the torsion bars 52 and 64 located in the apparatus of FIGS. 3 and 4 at the body-to-lever pivot axis 72. The linear spring S performs the same function as the torsion springs 52, 64 and the spring constant for spring S is related to the torsional spring constant by the equation $K_L = K_T/r^2$ where $K_L$ and $K_T$ are the linear and torsional spring constants, respectively, and $r$ represents the distance between the two pivot axes on the lever arm.

At position A, the rotor-vibration input is at its neutral position so that the rotor assembly, fuselage, spring and lever arm are all at neutral. Since there is no displacement of the spring at this point, no vibratory force is coupled to the body 12.

At position B, rotor-vibration is upward so that the rotor assembly 10, 14 moves up and the spring 52, 64 is extended. The lever arm 40, 42 is rotated clockwise. Because point B represents the position of maximum upward displacement, the weighted lever arm has reached its maximum excursion and has an angular velocity of zero. However, acceleration at this point of reversal is maximum and the downwardly directed inertial force applied by the lever arm to the fuselage through pivot axis 70 is equal in magnitude but opposite in direction to the upwardly directed force applied by the extended spring. The net result is zero force applied to the fuselage whereupon displacement of the latter remains at zero as shown at point B on the output waveform.

Figure 9:
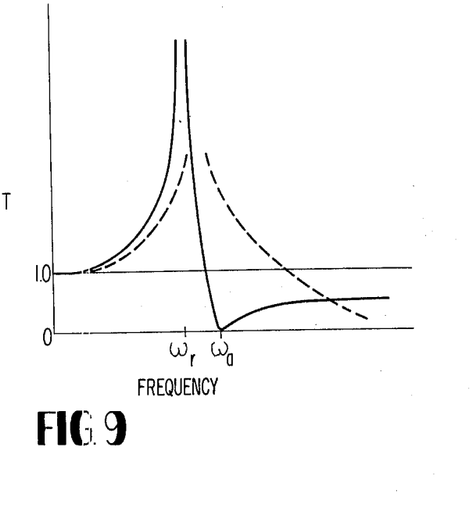
FIG. 9 is a graph showing a plot of transmissibility as a function of vibration frequency for the single frequency isolation apparatus of FIGS. 3 and 4.

Point C again depicts the neutral position of the apparatus with the spring in its relaxed state and with the lever arm rotating counterclockwise at maximum velocity and zero acceleration. The force balance on the fuselage again nets out to zero. At point B the spring reaches maximum compression and exerts a maximum downward force on the fuselage which is counteracted by the equal upwardly directed inertial force applied to the fuselage by the lever arm through pivot 70. At point E the device is again shown in neutral position. Thus, at a given frequency of vibration the body 12 remains stationary and it is completely decoupled or isolated from the vibration of the body 10, 14. The action of this type of so-called "nodal" isolator differs significantly from a conventional parallel spring/dashpot (damper) isolator. The transmissibility plot for a conventional isolator shows a resonant frequency and then at higher frequencies indicates isolation at a frequency ratio of $< \sqrt{2}$ with the isolation improving as the frequency increases, reaching 100% isolation at infinite frequencies. This is shown by the dashed curve on the transmissibility vs. frequency plot of FIG. 9. The present nodal isolator has a similar resonant frequency but then has a specific antiresonant frequency at which 100% isolation is achieved. This is illustrated by the solid line curve of FIG. 9. The resonant frequency is indicated on the abscissa at the point designated $\omega_r$ and the antiresonant frequency occurs at a higher frequency designated $\omega_a$.

The isolation characteristics of a conventional isolator change as the suspended gross weight changes. However, the present isolator achieves 100% isolation without regard to change in weight conditions. Furthermore, the spring rate used can be very stiff compared to the spring of a conventional isolator. The antiresonance frequency $\omega_a$ is determined in accordance with the following equation:

$$w_a = \left[ \frac{K_L}{\frac{I}{r^2} + m_2 \frac{R}{r}\left(\frac{R}{r} - 1\right)} \right]^{\frac{1}{2}}$$

where $K_L$ represents the spring constant of the linear spring S, $m_2$ represents the mass of the weighted lever arm 40, 42, 44, 46, R represents the spacing along the lever arm between the pivot axis 70 and the center of gravity of the weighted lever arm, $r$ represents the spacing D (see FIG. 3) between the two lever arm pivot axes and I represents the mass moment of inertia of the weighted lever arm about its center of gravity in a plane perpendicular to the pivot axes.

Looking at FIGS. 1-4, it can be seen that in accordance with this first aspect of the present invention, a vibration isolation system is provided including coupling means for connecting a vibrating mass to a body to be isolated at a plurality of points wherein at each of these coupling points the system includes a weighted lever arm 40, 42, 44, 46 together with first and second pivot means and torsion spring means. As embodied herein, the first pivot means includes yoke 56 and pivot block 60 for pivotally joining the vibrating mass to the lever arm at a first pivot location defined by the axis 70. As further embodied herein, the second pivot means includes the bearings 48 provided in the housings 44' and 46' and the mounting sleeves 50 and 64 and brackets 20 for pivotally joining the fuselage to the lever arm at a second pivot location defined by the axis 72 which is located between the first pivot location and the center of gravity of the lever arm.

As further embodied herein, the torsion spring means comprise the torsion bars 52 and 64 which function to transmit vibratory forces to the fuselage from the vibrating mass system via the pivot means so that inertial forces generated by vibration-induced displacement of the lever arm are applied to the fuselage through the second pivot means in opposition to vibratory forces of a first predetermined frequency coupled to the fuselage through the torsion springs. Operation of the system substantially isolates the fuselage from vibratory motion in response to vibratory forces of such predetermined frequency.

As previously mentioned, there is usually a second pronounced vibration frequency present in a system such as a helicopter. In accordance with a second aspect of the present invention, the heretofore described vibration isolation system is modified so as to substantially eliminate both predominant vibration frequencies. In summary, this result is achieved by including in the system a secondary spring-mass structure additional to the weighted lever arm and main coupling springs. The mass and spring constant of this additional spring-mass structure is chosen such that the combined operation of the basic isolator structure together with the additional spring-mass structure is to generate a two-frequency system of inertial forces which are applied to the fuselage to isolate it from both predominant vibration frequencies.

Figure 6A:
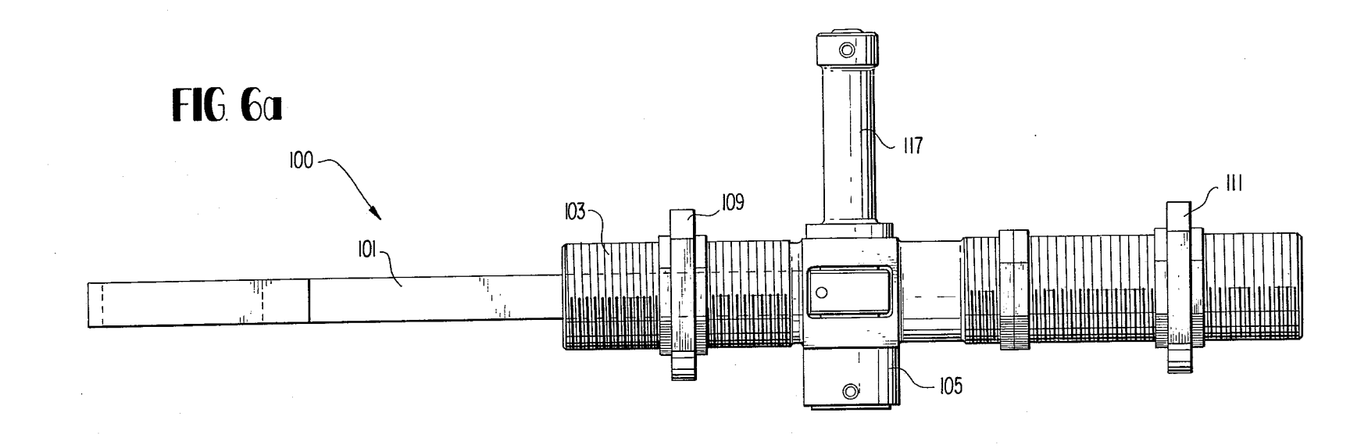
FIG. 6a is a top plan view of an articulated lever arm which can be substituted for the rigid lever arm used with the apparatus of FIGS. 3 and 4 for imparting dual frequency isolation characteristics to the system.
Figure 6B:
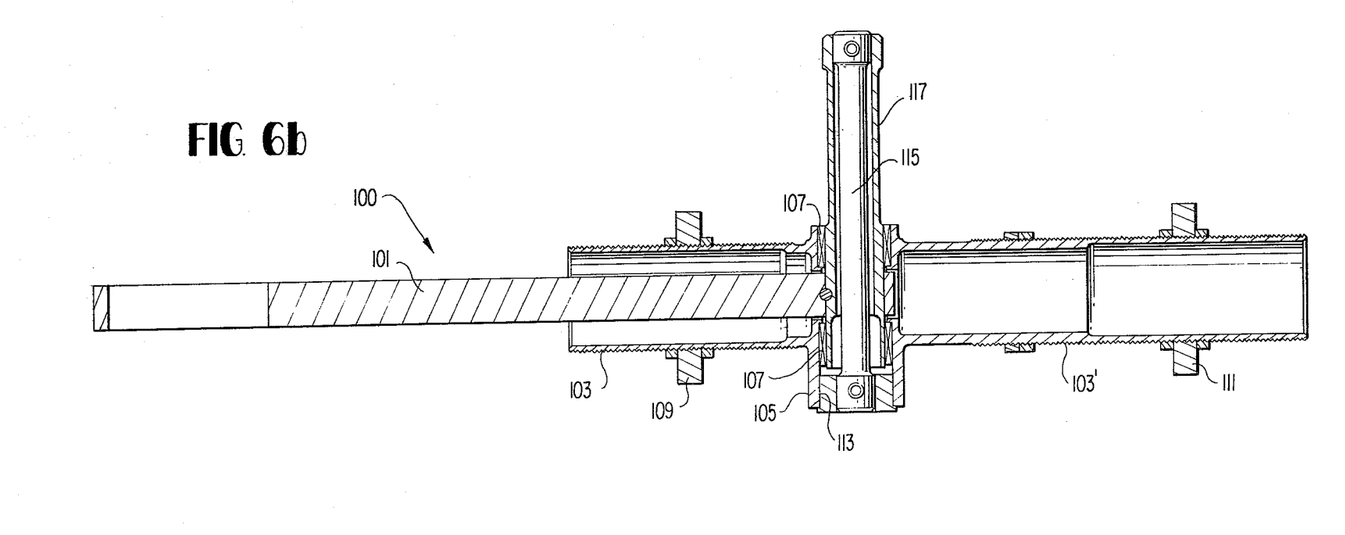

FIG. 6a shows an articulated weighted lever arm constructed so as to be assembled into the system shown in FIGS. 3 and 4 in place of the rigid lever arm 40, 42. FIG. 6a shows a top plan view of the articulated lever arm and FIG. 6b shows the arm in center cross-section to provide illustration of the internal elements. In general, the weighted lever arm shown in FIGS. 6a and 6b comprises a rigid portion 101 having a fitting at its left end suitable for connection into the assembly of FIGS. 3 and 4. A weighted tubular member 103 is pivotally connected to the arm 101 via a resilient pivot connection. A sleeve member 117 is rigidly affixed to arm 101 at the right-hand end of the latter. A pair of bearings 107 are supported on sleeve 117 to provide the necessary pivot support for the tubular member 103.

Tubular member 103 is connected to arm 101 by a torsion bar 115. One end of the torsion bar is connected to the sleeve 117 and the other end is connected via a bushing 113 to a right-angle extension 105 protruding from the side of tubular member 103. With this construction, the tubular member 103 is capable of pivotal movement at right angles to the plane of the drawing and such motion is resiliently restrained by the torsion bar 115.

A pair of threaded weight members 109 and 111 are provided on the outer surface of tubular member 103 to enable adjustment of both the mass-moment of inertia and the center of gravity of the secondary spring-mass system.

When the articulated lever arm of FIGS. 6a and 6b is substituted in the isolator assembly of FIGS. 3 and 4 in place of the weighted lever arm 40, 42, dual frequency vibration isolation operation is achieved. Isolation of the body (fuselage) from vibratory motion at the primary (lower) of the two predominant frequencies is provided by the inertial forces generated through vibration-induced displacement of the basic, rigid portion of lever arm 100. The rigid portion includes the arm 101, torsion bar 115, sleeve 117 and the bearings 107. The mass-moment of inertia of this portion of the structure is not adjustable and the center of gravity is fixed at a desired point somewhere between the ends of the arm 101.

Inertial forces for isolating the system from the secondary (higher) frequency of vibration are generated by the secondary weight member including the tubular element 103 and its adjustable weights 109 and 111. The position of the latter on tubular member 103 is adjustable to enable tuning of the secondary spring-mass structure for achieving optimum isolation at the lower as well as at the higher frequency. Movement of weights 109 and 111 by equal amounts away from one another adjusts the mass-moment of inertia of the secondary weight structure, thus changing predominantly the tuning of the lower frequency; movement of the weights by equal amounts in the same direction adjusts the center of gravity of the secondary weight structure, thus changing predominantly the tuning of the lower frequency.

Figure 7:
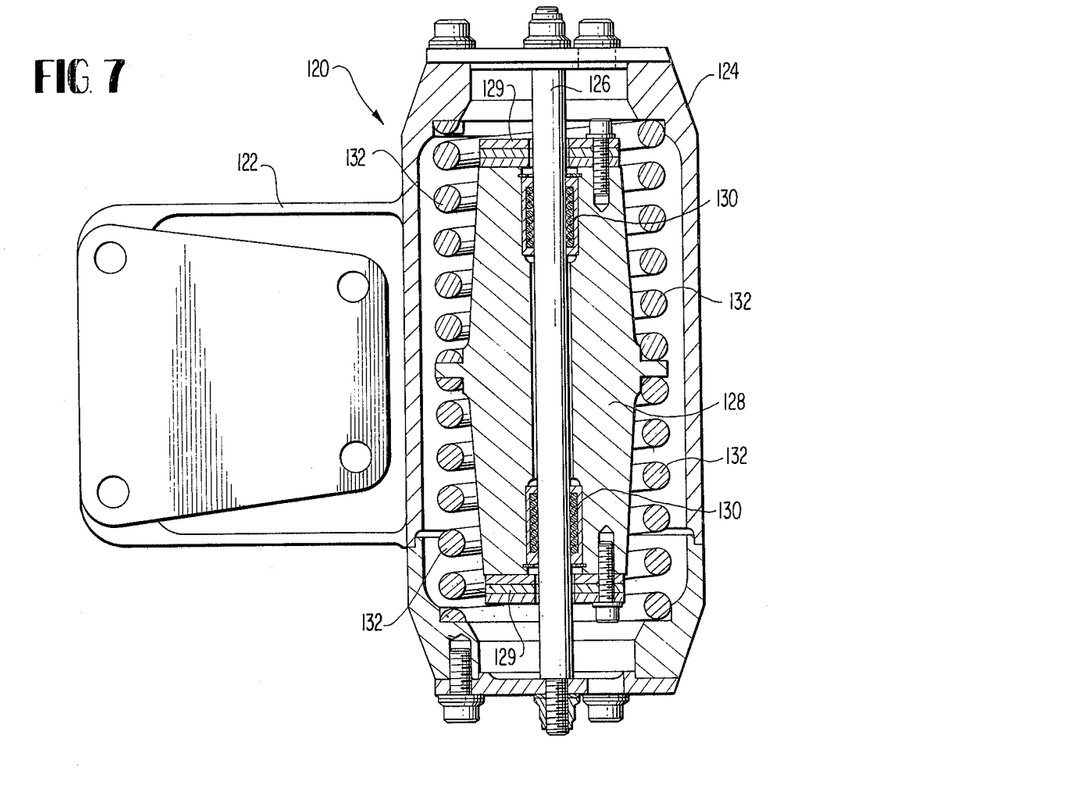
FIG. 7 illustrates another form of dual frequency lever arm for use in the apparatus of FIGS. 3 and 4.

FIG. 7 shows a second embodiment of a lever arm usable in the basic system to achieve dual-frequency isolation. This arm comprises a member 122 constructed to enable assembly of the arm into the structure of FIGS. 3 and 4 in place of lever arm 40 and additionally includes a frame member 124 which is rigidly affixed to member 122. A slide rail 126 is mounted within frame 124 and serves as a constraint for guiding the motion of a resiliently mounted secondary weight member 128. Weight 128 is supported on rail 126 for sliding movement by means of a pair of slider bearings 130 and is resiliently restrained by a set of compression springs 132. The top spring exerts a force on weight 128 which is equally opposed by the lower spring 132 such that weight 128 is maintained in a neutral position under static conditions.

Vibratory displacement of arm 120 causes the latter to generate inertial forces which provide vibration isolation at two predetermined frequencies in the same manner as previously described for the embodiment illustrated in connection with FIG. 6.

Figure 8:
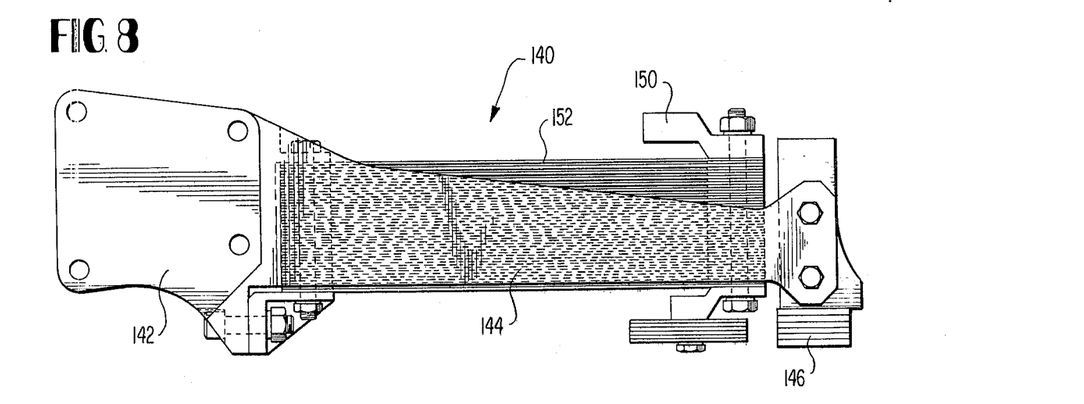
FIG. 8 shows a third form of dual frequency lever arm mechanism for use in the apparatus of FIGS. 3 and 4.

FIG. 8 illustrates a third embodiment of a weighted lever arm which functions to produce dual-frequency vibration isolation when inserted into the system of FIGS. 3 and 4 in place of the rigid arm 40, 42. Dual-frequency arm 140 comprises a connection section 142 constructed to permit assembly of the arm into the basic isolator, a center section 144 and a weight section 146. Center section 144 is configured in the form of a pair of spaced side rails so that a secondary weight member 150 and coupling spring 152 can be accommodated between the rails of the center section. Spring 152 is constructed of multiple parallel spring leafs which are constrained at either end so as to deform in an "S" configuration. The individual leafs are spaced apart by shims so that there is no frictional contact therebetween. This spring construction enables weight 150 to move along a straight path as though it was connected to the basic arm by a four-bar linkage. In top plan view the spring leafs are in the shape of an hourglass with the narrow dimension located about half-way between the ends.

It can be appreciated that the operation of the dual-frequency arm 140 of FIG. 8 is functionally identical to the assembly illustrated in FIG. 7 where the secondary weight member 128 is also resiliently supported for motion in a linear path.

Figure 11:
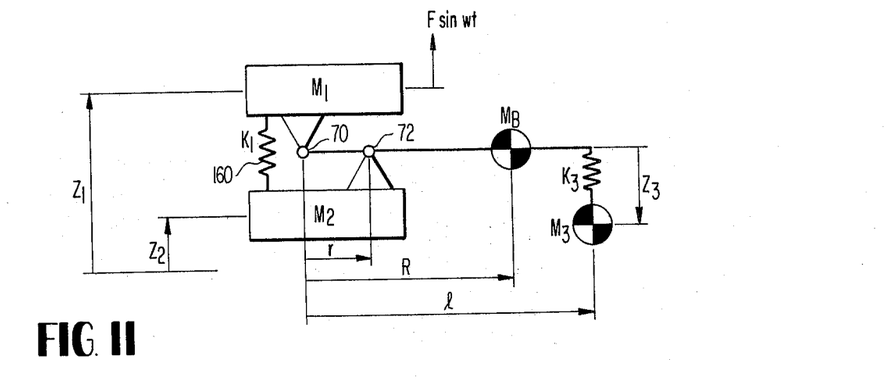
FIG. 11 is a schematic diagram illustrating a dual-frequency isolator of the type illustrated in connection with FIGS. 7 and 8.

FIG. 11 schematically illustrates a dual-frequency isolator utilizing a weighted lever arm construction in the manner illustrated in FIGS. 7 and 8 where the secondary weight is constrained for linear motion. The spring 160 illustrated in the schematic is a linear spring as opposed to the torsion spring arrangement as the main resilient coupling of the previously described isolator structures. However, as previously mentioned the two types of springs function in an equivalent manner and their spring constants are related by the formula $K_T = r^2 K_L$ where $K_T$ is the spring constant of the torsion spring, $K_L$ is the linear spring constant and $r$ represents the distance between pivot axes 70 and 72.

The two isolation frequencies for the dual-frequency isolator depicted in FIG. 11 and constructed as taught in connection with FIGS. 3, 4, 7 and 8 can be determined mathematically in accordance with the following equations of motion hereinafter set forth.

In connection with these equations the parameters, graphically illustrated in FIG. 11, are:

$M_1$ — Mass of the vibrating structure (i.e., rotor and transmission)

$M_2$ — Mass of the body to be isolated (fuselage)

$K_1$ — Spring constant of linear spring equivalent of the main torsional coupling springs $K_3$ — Spring constant for secondary spring-mass structure $M_B$ — Mass of primary (rigid) portion of the weighted lever arm such as the elements 122, 124, 126 of FIG. 7

$M_3$ — Mass of secondary weight member such as 128 of FIG. 7

R — Distance between the pivot axis 70 (FIG. 3) and the center of gravity of the mass $M_B$ r — Distance from pivot axis 70 to pivot axis 72 along the lever arm l — Distance from pivot axis 70 to the center of gravity of the secondary mass $M_3$ $Z_1$ — Displacement of mass $M_1$ relative to a stationary reference $Z_2$ — Displacement of mass $M_2$ relative to the same stationary reference $Z_3$ — Displacement of mass $M_3$ relative to the lever arm The equations of motion are written as follows:

$$\left[ M_1 + M_B \left( \frac{R}{r} - 1 \right)^2 + M_3 \left( \frac{l}{r} \right)^2 \right] \ddot{z}_1$$
$$- \left[ M_B \left( \frac{R}{r} - 1 \right) \frac{R}{r} + M_3 \left( \frac{l}{r} - 1 \right) \frac{l}{r} \right] \ddot{z}_2$$
$$+ M_3 \left( \frac{l}{r} - 1 \right) \ddot{z}_3 + K_1 (Z_1 - Z_2) = F \sin wt$$

$$- \left[ M_B \left( \frac{R}{r} - 1 \right) \frac{R}{r} + M_3 \left( \frac{l}{r} - 1 \right) \frac{l}{r} \right] \ddot{z}_1$$
$$+ \left[ M_2 + M_B \left( \frac{R}{r} \right)^2 + M_3 \left( \frac{l}{r} \right)^2 \right] \ddot{z}_2$$
$$- M_3 \frac{l}{r} \ddot{z}_3 + K_1 (-Z_1 + Z_2) = 0$$

-continued $$M_3\left(\frac{l}{r} - 1\right)\ddot{Z}_1 - M_3\frac{l}{r}\ddot{Z}_2 + M_3\ddot{Z}_3 + K_3Z_3 = 0$$

Converting to matrix form (assuming sinusoidal motion wherein $\ddot{Z} = -W^2Z$):

$$\begin{bmatrix} K_1 - w^2M_{11} & -(K_1 - w^2M_{12}) & -w^2M_{13} \\ -(K_1 - w^2M_{21}) & K_1 - w^2M_{22} & w^2M_{23} \\ -w^2M_{31} & w^2M_{32} & K_3w^2M_{33} \end{bmatrix}\begin{Bmatrix} Z_1 \\ Z_2 \\ Z_3 \end{Bmatrix} = \begin{Bmatrix} F \\ 0 \\ 0 \end{Bmatrix}$$

where $$M_{11} = M_1 + M_B\left(\frac{R}{r} - 1\right)^2 + M_3\left(\frac{l}{r}\right)^2$$

$$M_{12} = M_{21} = M_B\left(\frac{R}{r} - 1\right)\left(\frac{R}{r}\right) + M_3\left(\frac{l}{r} - 1\right)\frac{l}{r}$$

$$M_{13} = M_{31} = M_3\left(\frac{l}{r} - 1\right)$$

$$M_{22} = M_2 + M_B\left(\frac{R}{r}\right)^2 + M_3\left(\frac{l}{r}\right)^2$$

$$M_{23} = M_{32} = M_3\frac{l}{r}$$

$$M_{33} = M_3$$

The solution for $Z_2$ can be formally written:

$$Z_2 = \frac{\begin{bmatrix} K_1 - w^2M_{11} & F & -w^2M_{13} \\ -(K_1 - w^2M_{21}) & 0 & w^2M_{23} \\ -w^2M_{31} & 0 & K_3 - w^2M_{33} \end{bmatrix}}{\Delta}$$

where $\Delta$ = determinant of dynamic matrix.

The necessary and sufficient condition for $Z_2$ to become zero ($\Delta$ not equal to zero at the same time) is:

$$\begin{bmatrix} -(K_1 - W^2M_{21}) & W^2M_{23} \\ -W^2M_{31} & K_3 - W^2M_{33} \end{bmatrix} = 0$$

which yields:

$$\omega^4(M_{33}M_{12} - M_{31}M_{23}) - \omega^2(K_1M_{33} + K_3M_{21}) + K_1K_3 = 0$$

or, after some reduction, $$M_3M_B\left(\frac{R}{r} - 1\right)\frac{R}{r}W^4$$

$$-\left\{K_1M_3 + K_3\left[M_B\left(\frac{R}{r} - 1\right)\frac{R}{r} + M_3\left(\frac{l}{r} - 1\right)\frac{l}{r}\right]\right\}W^2$$

$$+ K_1K_3 = 0$$

Since this governing equation is a quadratic in $\omega^2$, it is apparent that with the proper choices of the variable parameters $K_1$, $K_3$, $M_B$, $R$, $r$, $l$ there will be two frequencies at which the desired goal of attaining $Z_2$ equal to zero can be achieved.

Through experience it has been determined that isolation performance for the dual-frequency isolator herein described is virtually independent of the value of $M_3$ (as long as $K_3$ is changed accordingly) and that isolation characteristics are primarily dependent on the value of $I_B$ which is defined by the equation:

$$I_B = M_F(R - r)R$$

for it is predominantly this parameter which controls the resonant frequency between the primary (lower) and secondary (higher) isolation frequencies. Increasing values of $I_B$ broadens the isolation frequency band near the primary frequency because the resonant frequency above the primary frequency is pushed upward closer to the secondary frequency.

In a specific example it has been found that the frequency band near the primary isolation frequency, at which transmissibility can be maintained at 0.1 or less, can be controlled to some extent, increasing it from approximately 20 to 30% by varying $I_B$ from 800 to 1200 pounds per square inch. Such an adjustment is not possible with a single frequency isolation system which in general has a constant tuning band width of around 20 to 25%.

The expression for transmissibility for the dual-frequency system is obtained from the above equations and is $$T = \frac{Z_2}{Z_1} = \frac{(K_1 - W^2M_{21})(K_3 - W^2M_{33}) - W^4M_{31}M_{23}}{(K_1 - W^2M_{22})(K_3 - W^2M_{33}) - W^4M_{23}^2}$$

There will be two frequencies at which $T = 0$ and two resonances, since both the numerator and demoninator are second-order polynomials in $\omega^2$.

Figure 10:
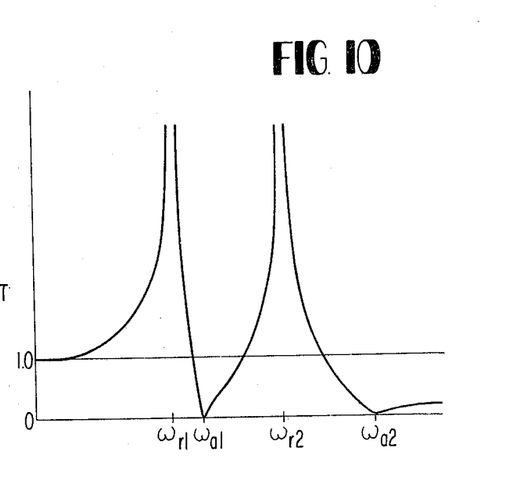
FIG. 10 is a graph showing a plot of transmissibility as a function of vibration frequency for the dual frequency isolation apparatus illustrated in connection with FIGS. 6a, 6b, 7 and 8.

FIG. 10 shows a graph of transmissibility for the dual-frequency system plotted as a function of frequency. The graph of FIG. 10 shows the two resonant frequencies $\omega_{r1}$ and $\omega_{r2}$ and shows the two antiresonant frequencies $\omega_{a1}$ and $\omega_{a2}$.

It is thus seen, in accordance with the dual-frequency isolation aspects of the invention, that a vibration isolation system is provided including spring means for coupling vibratory forces between a vibrating mass and a body to be isolated. As embodied herein, such spring means includes the torsion bars 52 and 64 as shown in FIG. 4. This aspect of the invention further comprises inertia means coupled between the vibrating mass and the body for responding to a predetermined frequency of vibration to apply forces to the body to substantially attenuate vibratory forces of said predetermined frequency coupled through the spring means. As herein embodied, such inertia means comprises the pivot means which couple the weighted lever arm to the vibrating mass and additionally comprises the rigid portion of the lever arm including, for example, the members 122, 124 and 126 of the lever arm shown in FIG. 7.

The invention further provides a spring-mass structure which is responsive to the motion of the vibrating mass at a frequency different from said predetermined frequency for applying forces to the body to substantially attenuate vibratory forces of said different frequency coupled through the spring means. As embodied herein such spring-mass structure includes the secondary weight structure and its spring suspension system such as, for example, the weight 128 and springs 132 of the structure illustrated in FIG. 7.

It will be apparent to those skilled in the art that various modifications and variations could be made in the embodiments of the vibration isolation system of the invention as herein-above described without departing from the spirit and scope of the invention.

What is claimed is:

1. A vibration isolation system for connecting a body to a vibrating mass with minimum transfer of vibration therebetween comprising, in combination:
coupling means for connecting said vibrating mass to said body at a plurality of points, said coupling means including at each of said points:
a weighted lever arm;
first pivot means for pivotally joining said mass to said lever arm at a first pivot location displaced from the center of gravity of said arm;
second pivot means for pivotally joining said body to said lever arm at a second pivot location between said first pivot location and said center of gravity; and
torsion spring means connected to said lever arm for transmitting vibratory forces to said body from said vibrating mass via said pivot means whereby inertial forces generated by vibration-induced displacement of said lever arm are applied to said body through said second pivot means in opposition to vibratory forces of a first predetermined frequency coupled to said body through said torsion spring such that said body is substantially isolated from vibratory motion in response to said vibratory forces of said first predetermined frequency.

2. The system set forth in claim 1 wherein said torsion spring means is connected between said body and said lever arm at said second pivot location to provide a resilient pivot action thereat.

3. The system set forth in claim 2 wherein said torsion spring means comprises:
a torsion bar affixed at a first end to said lever arm;
a mounting sleeve arranged concentrically about said torsion bar and connected thereto at the end opposite said first end;
bearing means supporting said sleeve for pivotal movement relative to said arm; and
means for connecting said body to said mounting sleeve.

4. The system set forth in claim 1 further comprising:
third pivot means for providing a third pivot location on said lever arm in alignment with one of said first and second pivot locations; and
additional torsion spring means connected to said lever arm at said third pivot location for providing additional spring resistance to said vibratory forces.

5. The system set forth in claim 4 wherein said third pivot location is in alignment with said second pivot location.

6. The system set forth in claim 5 wherein said additional torsion spring means comprises:
a torsion bar affixed at a first end to said lever arm;
a mounting sleeve arranged concentrically about said torsion bar and connected thereto at the end opposite said first end;
bearing means supporting said sleeve for pivotal movement relative to said arm; and
means for connecting said body to said mounting sleeve.

7. The system set forth in claim 1 further comprising:
a secondary weight; and
spring means for resiliently connecting said secondary weight to said lever arm whereby inertial forces generated by vibration-induced displacement of said secondary weight are applied to said body through said second pivot means to counteract vibratory forces of a second predetermined frequency coupled between said mass and said body.

8. The system set forth in claim 7 wherein said weighted lever arm and said secondary weight are constructed and arranged such that the vibratory forces of said second frequency counteracted by said secondary weight and spring means are of a higher frequency than said first frequency.

9. The system set forth in claim 1 wherein one of said pivot means is constructed and arranged to provide first and second mutually perpendicular pivot axes whereby said system is adapted to isolate angular as well as linear components of vibration emanating from said mass.

10. The system set forth in claim 9 wherein said coupling means provides a four-point connection between said vibrating mass and said body and wherein said first and second mutually perpendicular pivot axes are included in said first pivot means.

11. Vibration isolation apparatus for connecting a body to a vibrating mass with minimum transfer of vibration therebetween comprising, in combination:
a weighted lever arm;
first pivot means for pivotally connecting said vibrating mass to said lever arm at a first pivot location on the latter;
second pivot means for pivotally connecting said body to said lever arm at a second pivot location on said arm displaced from the center of gravity thereof;
first spring means constructed and arranged to couple vibratory forces between said vibrating mass and said body;
a secondary weight; and
second spring means for resiliently connecting said secondary weight to said lever arm whereby inertial forces generated by vibration-induced displacement of said lever arm and said secondary weight are applied to said body through said second pivot means to counteract vibratory forces of two different frequencies applied to said body through said first spring means.

12. The apparatus set forth in claim 11 wherein said spring means comprises a torsion spring connected between said body and said lever arm at said second pivot location such that said second pivot means provides a resilient pivot connection.

13. The apparatus set forth in claim 11 wherein said secondary weight comprises a weighted member pivotally connected to said weighted lever arm and said second spring means comprises a torsion spring coupled between said lever arm and said weighted member at the pivot connection therebetween.

14. The apparatus set forth in claim 11 further comprising a guide post affixed to said weighted lever arm and wherein said secondary weight comprises a weighted member slidable on said guide post.

15. The apparatus set forth in claim 14 wherein said second spring means comprises a pair of compression springs arranged to apply oppositely directed spring forces against said weighted member.

16. The apparatus set forth in claim 11 wherein said first second spring means comprises a leaf spring connected to said lever arm at a point between said second pivot location and the center of gravity of said lever arm.

17. A vibration isolation system for connecting a body to a vibrating mass with minimum transfer of vibration therebetween comprising, in combination:
  coupling means for connecting said vibrating mass to said body at a plurality of points, said coupling means including at each of said points:
  a weighted lever arm;
  first pivot means for pivotally joining said mass to said lever arm at a first pivot location displaced from the center of gravity of said arm;
  second pivot means for pivotally joining said body to said lever arm at a second pivot location between said first pivot location and said center of gravity;
  torsion spring means connected to said lever arm for transmitting vibratory forces to said body from said vibrating mass via said pivot means;
  a guide post affixed to said weighted lever arm;
  a weighted member slidably movable on said guide post; and
  a pair of compression springs arranged to apply oppositely directed spring forces against said weighted member whereby inertial forces generated by vibration-induced displacement of said lever arm and said weighted member are applied to said body through said second pivot means in opposition to vibratory forces of a first and second predetermined frequency coupled to said body through said torsion spring means such that said body is substantially isolated from vibratory motion in response to said vibratory forces of said first and second predetermined frequency.

18. Vibration isolation apparatus for connecting a body to a vibrating mass with minimum transfer of vibration therebetween comprising, in combination:
  spring means for coupling vibratory forces between said vibrating mass and said body;
  inertia means coupled between said vibrating mass and body, said inertia means operating in response to a predetermined frequency of motion of said vibrating mass to apply forces to said body which substantially attenuate vibratory forces of said predetermined frequency coupled through said spring means; and
  a spring-mass structure responsive to motion of said vibrating mass at a frequency different from said predetermined frequency for applying forces to said body which substantially attenuate vibratory forces of said different frequency coupled through said spring means.

19. The apparatus set forth in claim 18 wherein said different frequency is higher than said predetermined frequency.

20. The apparatus set forth in claim 18 wherein said inertia means comprises a weighted lever arm pivotally connected to said body and wherein said spring-mass structure comprises a weight resiliently connected to said lever arm whereby said forces for attenuating said vibratory forces of said two frequencies are applied to said body through said pivot connection between lever arm and said body.

* * * * *